United States Patent
MacInnis

(10) Patent No.: US 8,692,934 B2
(45) Date of Patent: Apr. 8, 2014

(54) METHOD AND SYSTEM FOR FRAME RATE ADAPTATION

(71) Applicant: Broadcom Corporation, Irvine, CA (US)

(72) Inventor: Alexander MacInnis, Los Altos, MI (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/859,207

(22) Filed: Apr. 9, 2013

(65) Prior Publication Data

US 2013/0223535 A1    Aug. 29, 2013

Related U.S. Application Data

(63) Continuation of application No. 11/516,262, filed on Sep. 6, 2006, now Pat. No. 8,427,578.

(60) Provisional application No. 60/726,970, filed on Oct. 14, 2005.

(51) Int. Cl.
*H04N 7/26* (2006.01)
*H04N 7/01* (2006.01)

(52) U.S. Cl.
USPC ........... 348/452; 348/451; 348/700; 348/699; 348/415.1; 382/236; 375/240.01

(58) Field of Classification Search
USPC ................. 348/452, 451, 448, 699, 700, 701, 348/412.1, 413.1, 415.1; 375/240.01, 375/240.02, 240.13; 382/236, 238, 239
See application file for complete search history.

(56) References Cited

U.S. PATENT DOCUMENTS

| | | | |
|---|---|---|---|
| 6,192,080 B1 | 2/2001 | Sun et al. | |
| 7,221,706 B2 | 5/2007 | Zhao et al. | |
| 7,609,763 B2 | 10/2009 | Mukerjee et al. | |
| 7,653,129 B2 | 1/2010 | He et al. | |

*Primary Examiner* — Jefferey Harold
*Assistant Examiner* — Jean W Desir
(74) *Attorney, Agent, or Firm* — Thomas | Horstemeyer, LLP

(57) ABSTRACT

Described herein are a method and system for frame rate adaptation. There may be conditions that require the rate of a video sequence to be dynamically controlled, and a frame interval may be adaptively selected every frame. A frame within the video sequence may contain, for example, a time stamp that is transmitted to a decoder to indicate the change in temporal spacing between frames.

19 Claims, 5 Drawing Sheets

METHOD AND SYSTEM FOR FRAME RATE ADAPTATION

RELATED APPLICATIONS

This application is a continuation of copending U.S. utility application entitled, "Method and System for Frame Rate Adaption," having Ser. No. 11/516,262, filed Sep. 6, 2006, which claims priority to U.S. provisional application entitled, "Method and System for Frame Rate Adaption," having Ser. No. 60/726,970, filed Oct. 14, 2005, all of which are entirely incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video communications systems are continually being enhanced to meet requirements such as reduced cost, reduced size, improved quality of service, and increased data rate. Many advanced processing techniques can be specified in a video compression standard. Typically, the design of a compliant video encoder is not specified in the standard. Optimization of the communication system's requirements is dependent on the design of the video encoder.

Video encoding standards, such as H.264, may utilize a combination of intra-coding and inter-coding. Intra-coding in H.264 uses spatial prediction based on information that is contained in the picture itself. Inter-coding uses motion estimation and motion compensated prediction. The encoding process for motion estimation includes selecting motion data that describes a displacement applied to samples of another picture. As the complexity of a video compression system increases, optimization of the platform constraints must be considered.

Limitations and disadvantages of conventional and traditional approaches will become apparent to one of ordinary skill in the art through comparison of such systems with the present invention as set forth in the remainder of the present application with reference to the drawings.

BRIEF SUMMARY

Described herein are system(s) and method(s) for frame rate adaptation, substantially as shown in and/or described in connection with at least one of the figures, as set forth more completely in the claims.

These and other advantages and novel features of the present invention will be more fully understood from the following description.

DETAILED DESCRIPTION

According to certain aspects of the present invention, a system and method for frame rate adaptation are presented. There may be conditions that require the rate of a video sequence to be dynamically controlled, and a frame interval may be adaptively selected every frame. A frame within the video sequence may contain, for example, a time stamp that is transmitted to a decoder to indicate the change in temporal spacing between frames.

Figure 1:
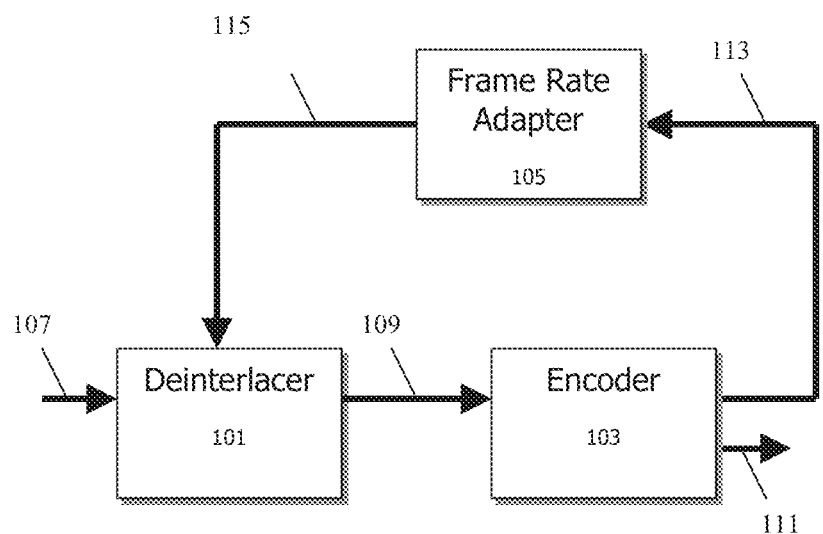
FIG. 1 is a block diagram of an exemplary system for frame rate adaptation in accordance with an embodiment of the present invention.

Referring now to FIG. 1, a block diagram of an exemplary system for frame rate adaptation is presented in accordance with an embodiment of the present invention. The system comprises a deinterlacer 101, an encoder 103, and a frame rate adapter 105. The frame rate of an encoder output 111 is not necessarily the same as the frame rate of the deinterlacer input 107. For example if the frame rate of the deinterlacer input 107 is 60 fps, one frame may be skipped during processing to result in 30 fps instantaneously. If the input 107 to the deinterlacer 101 is 60 fps, it would be advantageous to select the frame intervals of the encoder output 111 as integer multiples of $\frac{1}{60}^{th}$ of a second, i.e. the intervals between frames may $\frac{1}{60}$ or $\frac{2}{60}$ or $\frac{3}{60}$ of a second, at any point in time.

Interlaced video 107 may be used, for example, in broadcast transmitters or local recording systems. A video processing system 100 that receives interlaced video 107 will typically perform deinterlacing. The output of deinterlacing 109 may be a video stream having a rate of 60 frames per second (fps). Alternatively, the video stream 109 may have an instantaneous frame rate of 30 fps or less if a decision 115 has been made to skip one or more frames. Adaptive selection 115 of the intervals may be according to parameters 113 from the encoder 103 such as bit usage in the encoder, cycles available in the processor, and/or motion in the video stream.

The bit rate usage is dependent on the decisions (e.g. the selection of quantization level) made by the encoder 103. Bit usage is an indication of how hard the encoder 103 has to work to code the frame to a given level of distortion.

The frame rate adapter 105 may select a longer frame interval 115 to optimize the combination of quality and bit rate in the encoder 103. For example, for content with a large amount of detail, skipping a frame may allow the encoder to apply more of its bit rate budget to coding the remaining frames with high quality, and this may result in overall improved perceptual quality. Also for example, the encoder 103 may be software-based, and there may be difficulty in keeping up with the 60 fps encoding rate in software.

If there is a lot of consistent motion, the frame rate may be held at 60 fps since 30 fps can result in a jerky video appearance with some types of motion content. When the level of detail in individual frames is high and the level of motion in the video stream is low, the frame rate may be dynamically reduced based on the combination of motion estimation and rate control. For example, a static scene may not be substantially degraded if every other frame is skipped. The goal is to preserve the details when things are not moving very fast.

Figure 2:
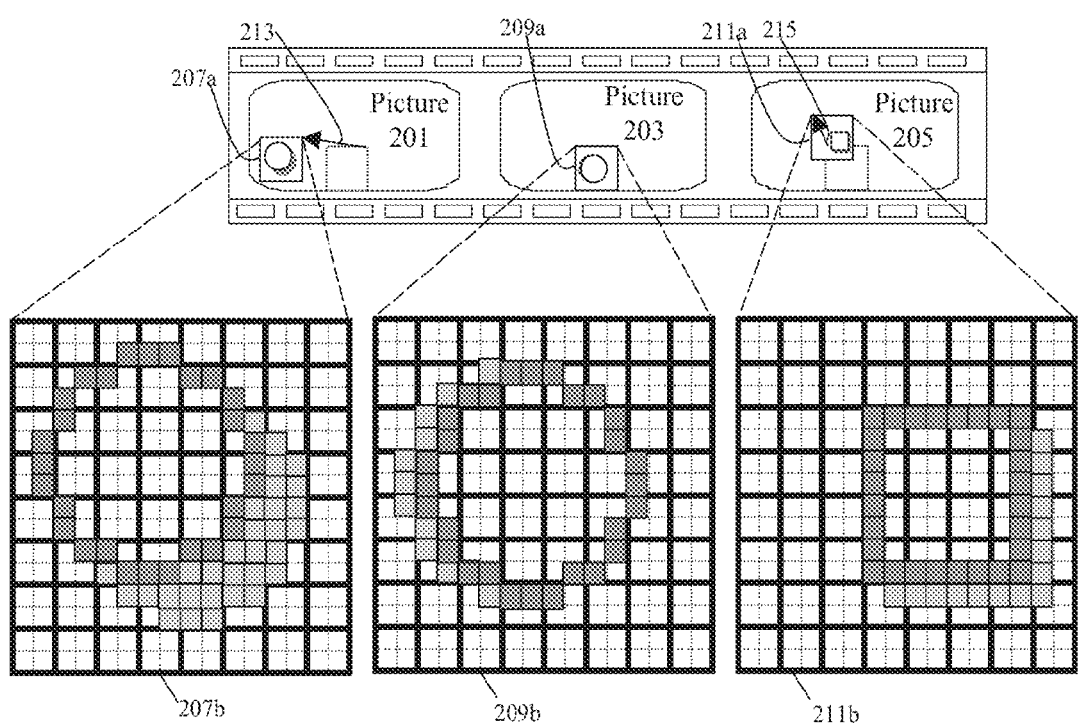
FIG. 2 is a block diagram describing spatially encoded macroblocks in accordance with an embodiment of the present invention.

In FIG. 2, there is illustrated a video sequence comprising pictures 201, 203, and 205 that can be used to describe motion estimation. Motion estimation may utilize a previous picture 201 and/or a future picture 205. A reference block 207 in the previous picture 201 and/or a reference block 211 in the future picture 205 may contain content that is similar to a current block 209 in a current picture 203. Motion vectors 213 and 215 give the relative displacement from the current block 209 to the reference blocks 207 and 211 respectively.

With reference to a motion vector, a block is a set of pixels to which the motion vector applies. A 16×16 block corresponds to a motion vector per macroblock. A 16×16 block may be more likely than a smaller block to cause false motion artifacts when objects having different motion velocities are spatial close together. A block may be as small as 1×1, i.e. one pixel.

Since the sampling density of a block may not be the same in both the vertical axis and the horizontal axis, the dimensions of a block can be different. In a 4×3 interlaced picture with 720 pixels horizontally and 240 pixels vertically, the horizontal sampling density is approximately 2.25 times the vertical sampling density.

FIG. 2 also illustrates an example of a scene change. In the first two pictures 201 and 203 a circle is displayed. In the third picture 205 a square is displayed. There will be a high confidence that the past reference block 207 can predict the current block 209, and there will be a low confidence that the future reference block 211 can predict the current block 209.

Figure 3:
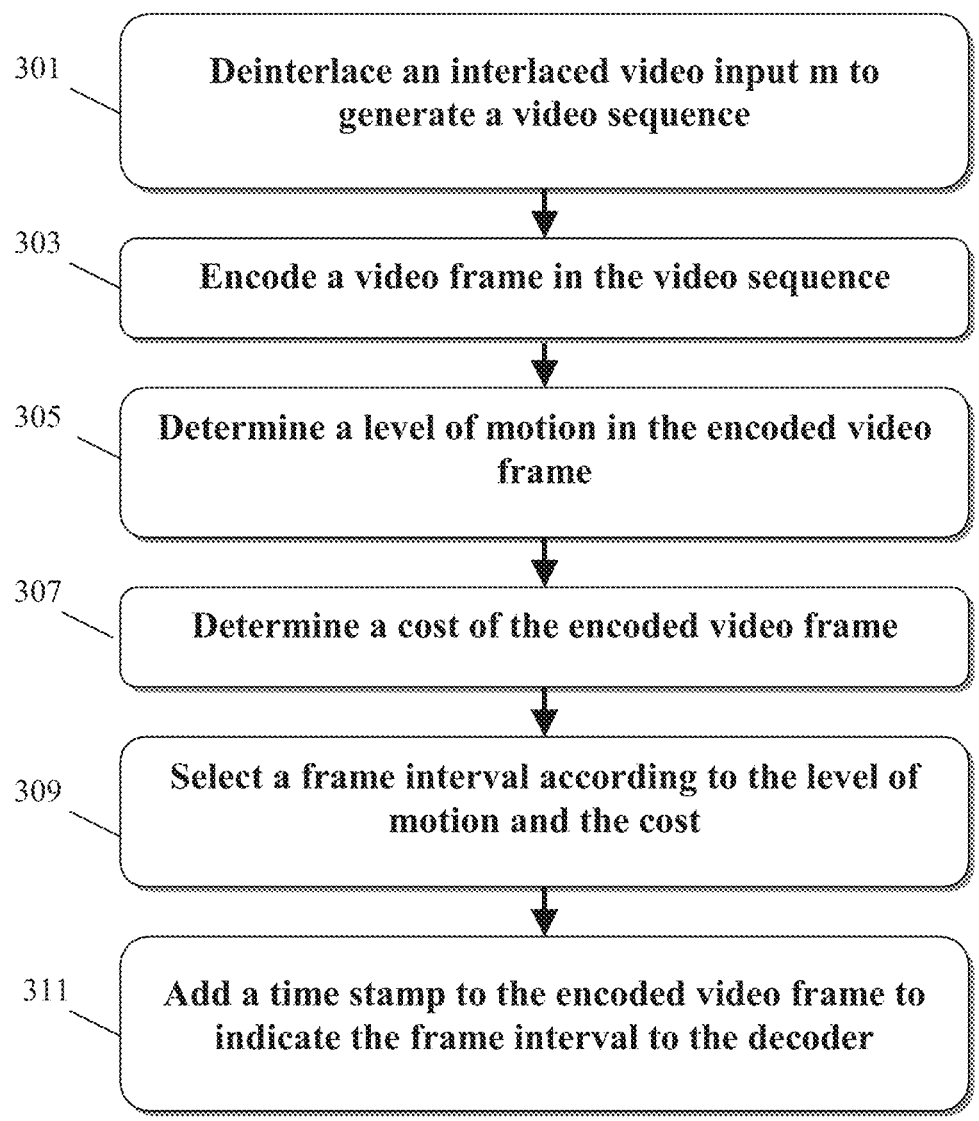
FIG. 3 is a flow diagram of frame rate adaptation in accordance with an embodiment of the present invention.

FIG. 3 is a flow diagram, 300, of an exemplary method for frame rate adaptation in accordance with an embodiment of the present invention.

An interlaced video input may be deinterlaced to generate a video sequence at 301. At 303, a video frame in the video sequence is encoded. The encoding may comprise rate control and/or mode decision. Mode decision may select motion compensation or spatial prediction.

A level of motion in the encoded video frame is determined at 305.

A cost of the encoded video frame is determined at 307. The cost may be determined during rate control and may be based on a bit usage parameter or a measure of distortion. The cost may be estimated from the residual from a motion compensated prediction function or spatial prediction function. Alternatively, the cost may be based on a number of cycles used during the encoding.

At 309, a frame interval is selected according to the level of motion and the cost. The frame interval may be longer if the cost is high, and the frame interval may be longer if spatial prediction is selected. The frame interval may be adapted dynamically according to the budget for compressed bits. For example, if the rate control function decides to constrain the number of bits generated, it may increase the frame interval as an alternative to increasing the quantization level.

At 311, a time stamp may optionally be added to the encoded video frame to indicate the frame interval to the decoder.

Figure 4:
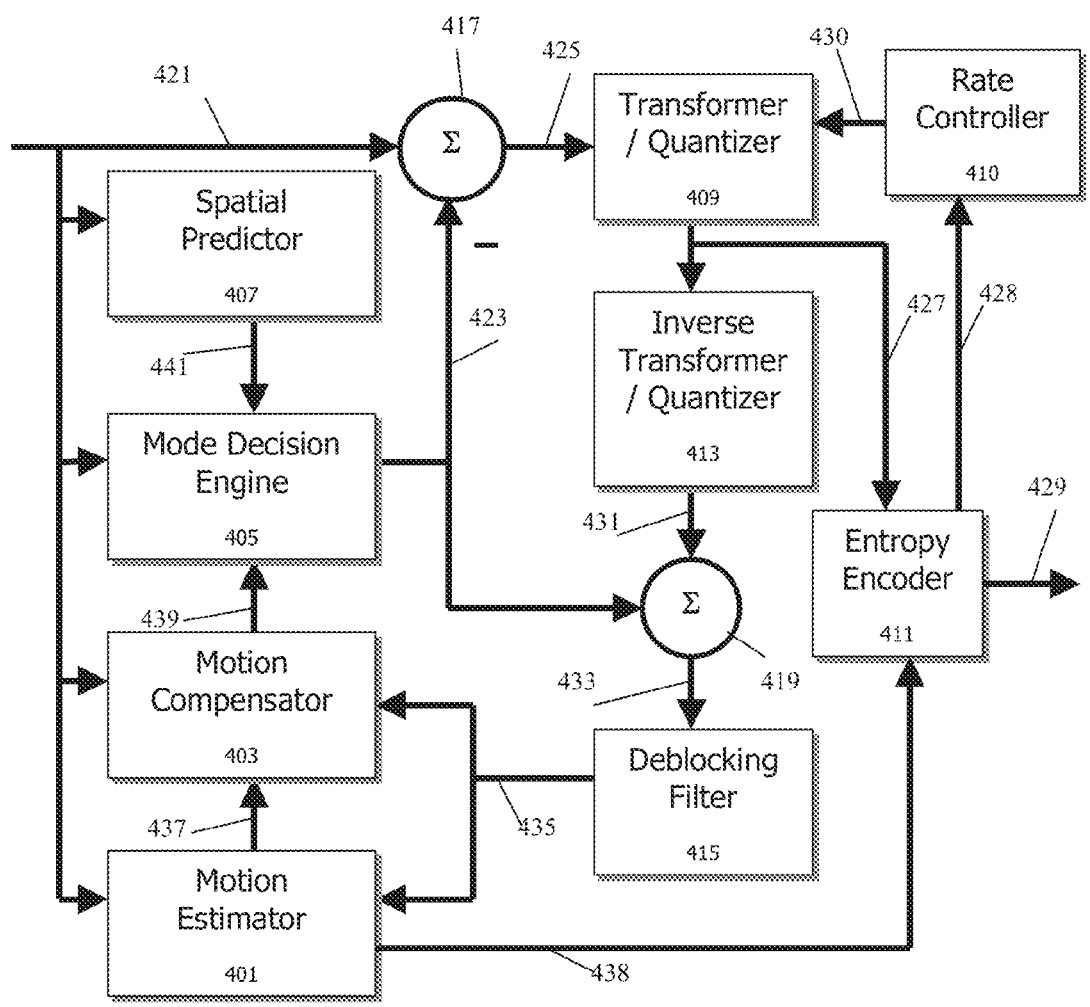
FIG. 4 is a block diagram of an exemplary video encoding system in accordance with an embodiment of the present invention.

Referring now to FIG. 4, there is illustrated a block diagram of exemplary system 400 using motion estimation. The video encoder 400 comprises a motion estimator 401, a motion compensator 403, a mode decision engine 405, spatial predictor 407, a transformer/quantizer 409, a rate controller 410, an entropy encoder 411, an inverse transformer/quantizer 413, and a deblocking filter 415.

Spatially predicted pictures are intra-coded. The spatial predictor 407 uses only the contents of a current picture 421 for prediction. The spatial predictor 407 receives the current picture 421 and produces a spatial prediction 441 utilizing neighboring reference blocks.

The motion estimator 401 decides whether to divide a macroblock into partitions. In the motion estimator 401, a set of motion vectors 437 for a partition in the current picture 421 may be estimated from reference pixels 435. The motion estimator 401 receives the partition in the current picture 421 and a set of reference pixels 435 for prediction.

The motion compensator 403 receives the motion vectors 437 and the reference pixels 435 and generates a temporal prediction 439.

The mode decision engine 405 will receive the spatial prediction 441 and temporal prediction 439 and may select the prediction mode according to a sum of absolute transformed difference (SATD) cost that optimizes the compressed data rate and distortion. A selected prediction 423 is output. The mode decision engine 405 may select spatial or temporal prediction separately for each macroblock.

Once the mode is selected, a corresponding prediction error 425 is the difference 417 between the current picture 421 and the selected prediction 423. The mode decision engine 405 may provide the level of motion and a measure of the prediction error 425 to the frame rate adapter 105 in FIG. 1. Additionally, the mode decision engine 405 may also provide the frame rate, the measure of distortion, and/or the quantization level to the frame rate adapter 105.

The transformer/quantizer 409 transforms the prediction error and produces quantized transform coefficients 427.

The entropy encoder 411 receives the quantized transform coefficients 427 and produces a video output 429. In the case of temporal prediction, a set of motion vectors 437 and picture reference indices 438 are entropy encoded as well.

The rate controller 410 can receive the actual bit usage 428 from the entropy encoder 411 and provide control 430 to the transformer/quantizer 409. The control 430 may indicate the quantization level to use. The rate controller 410 may also provide the bit usage to the frame rate adapter 105 in FIG. 1. For example, the rate controller 410 could indicate that a next picture may be skipped to save bits.

The quantized transform coefficients 427 are also fed into an inverse transformer/quantizer 413 to produce a regenerated prediction error 431. The original prediction 423 and the regenerated prediction error 431 are summed 419 to regenerate a reference picture 433 that is passed through the deblocking filter 415 and used for motion estimation and motion compensation.

Figure 5A:
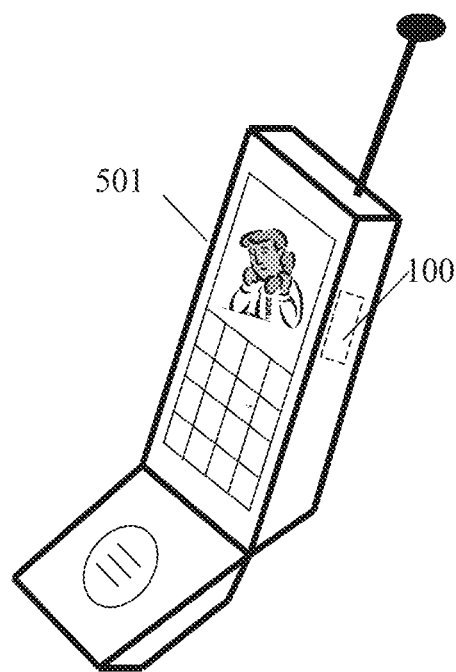
FIG. 5A is a picture of an exemplary communication device in accordance with an embodiment of the present invention.

FIG. 5A is a picture of an exemplary communication device in accordance with an embodiment of the present invention. A mobile telephone 501 equipped with video capture and/or display may comprise the system 100 for frame rate adaptation.

Figure 5B:
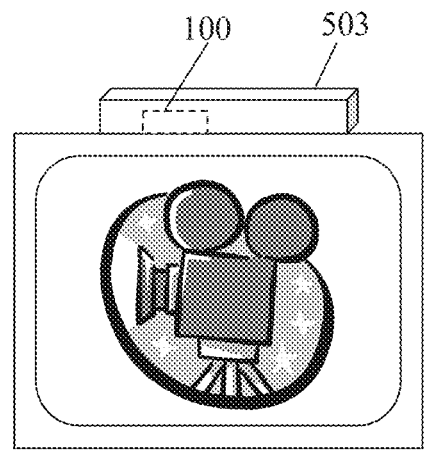
FIG. 5B is a picture of an exemplary video display device in accordance with an embodiment of the present invention.

FIG. 5B is a picture of an exemplary video display device in accordance with an embodiment of the present invention. A set-top box 502 equipped with video capture and/or display may comprise the system 100 for frame rate adaptation.

The embodiments described herein may be implemented as a board level product, as a single chip, application specific integrated circuit (ASIC), or with varying levels of a video processing circuit integrated with other portions of the system as separate components. An integrated circuit may store a supplemental unit in memory and use an arithmetic logic to encode, detect, filter, and format the video output.

The degree of integration of the video processing circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, the invention can be applied to video data encoded with a wide variety of standards.

Therefore, it is intended that the present invention not be limited to the particular embodiment disclosed, but that the present invention will include all embodiments falling within the scope of the appended claims.

What is claimed is:

1. A method for frame rate adaptation, comprising:
 receiving an encoded video sequence;
 determining a level of motion in an encoded video frame of the encoded video sequence;
 determining a cost based at least in part on a measure of spatial prediction and temporal prediction used in encoding the encoded video frame;
 selecting a frame interval for the encoded video sequence based at least on the level of motion and the cost; and
 embedding a time stamp in the encoded video frame, the time stamp indicating a change in temporal spacing between video frames of the encoded video sequence to a decoder.

2. The method of claim 1, further comprising identifying a prediction mode to be used in encoding a video frame, wherein the video frame comprises a plurality of pictures and a prediction mode used in encoding a picture of the video frame is identified between motion compensation or intra coding according to generated spatial prediction and temporal prediction of the picture.

3. The method of claim 1, the encoded video frame is in a video sequence.

4. The method of claim 3, wherein the cost is further based on a number of cycles for encoding a video frame.

5. The method of claim 3, wherein encoding a video frame comprises rate control, and wherein the rate control determines cost.

6. The method of claim 3, wherein the frame interval is longer if intra coding is selected.

7. The method of claim 3, wherein the method further comprises deinterlacing an interlaced video input to generate the video sequence.

8. The method of claim 1, wherein the cost is a bit usage parameter.

9. The method of claim 8, wherein the bit usage parameter is based on a measure of prediction error.

10. The method of claim 1, wherein the frame interval is longer if the cost is high.

11. A system for frame rate adaptation, comprising:
 a video encoder for encoding a video frame in a video sequence, wherein the video encoder is further operable to determine a level of motion in the encoded video frame; and determine a cost based at least in part on a measure of spatial prediction and temporal prediction used in encoding the encoded video frame; and
 frame rate adapter circuitry operable to receive the encoded video frame and adapt a frame rate of the video sequence, wherein the frame rate adapter circuitry is further operable to select a frame interval based at least on the level of motion and the cost and is operable to embed a time stamp in the encoded video frame, the time stamp indicating a change in temporal spacing between encoded video frames of the video sequence to a decoder.

12. The system of claim 11, wherein the video encoder comprises a rate controller, and wherein the cost is an output of the rate controller.

13. The system of claim 12, wherein the cost is a bit usage parameter.

14. The system of claim 11, wherein the cost is further based on a measure of prediction error.

15. The system of claim 11, wherein the system further comprises a processing meter and the cost is further based on a number of cycles per second determined from the processing meter.

16. The system of claim 11, wherein the frame interval is longer if the cost is high.

17. The system of claim 11, wherein the video encoder is further operable to identify a prediction mode to be used in encoding the video frame, wherein the video frame comprises a plurality of pictures and wherein a prediction mode used in encoding a picture of the encoded video frame is identified between motion compensation or intra coding according to the measured spatial prediction and temporal prediction of the encoded video frame.

18. The system of claim 11, wherein the frame interval is longer if intra coding is selected.

19. A communication device comprising:
 an integrated circuit comprising:
  a memory operable to store an encoded video sequence;
  a first circuit operable to determining a level of motion in an encoded video frame of the encoded video sequence;
  a second circuit operable to determine a cost based at least in part on a measure of spatial prediction and temporal prediction used in encoding the encoded video frame;
  a third circuit operable to select a frame interval for the encoded video sequence based at least on the level of motion and the cost based at least in part on a measure of spatial prediction and temporal prediction used in encoding the encoded video frame; and
  a fourth circuit operable to embed a time stamp in the encoded video frame, the time stamp indicating a change in temporal spacing between video frames of the encoded video sequence to a decoder.

* * * * *